April 11, 1950 T. C. THOMPSON 2,503,526
REEL
Filed July 25, 1946 2 Sheets-Sheet 1

INVENTOR.
THOMAS C. THOMPSON
BY Victor J. Evans & Co.
ATTORNEYS

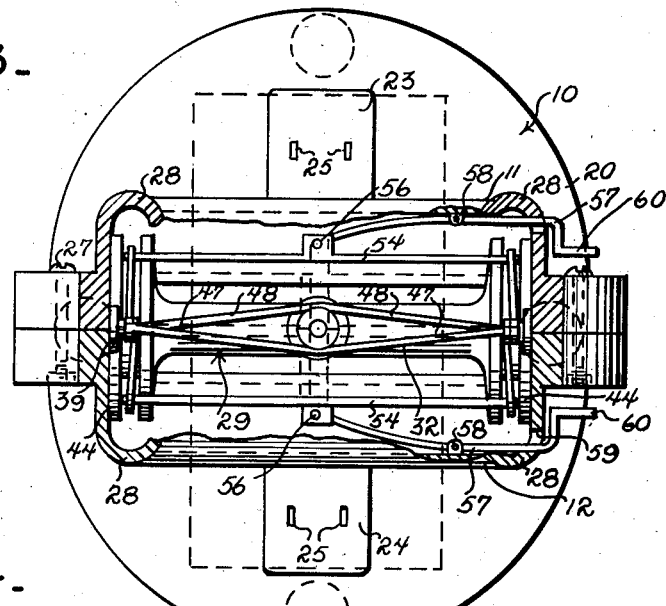
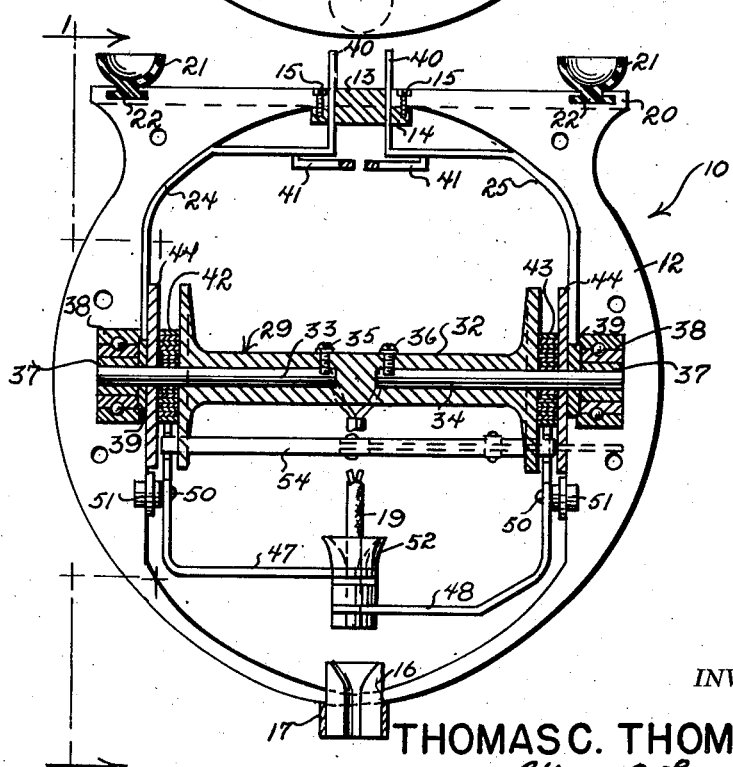

Patented Apr. 11, 1950

2,503,526

UNITED STATES PATENT OFFICE 2,503,526

REEL

Thomas C. Thompson, Baltimore, Md.

Application July 25, 1946, Serial No. 686,165

4 Claims. (Cl. 242—107)

My present invention relates to an improved portable electrical conductor and reel of the multi-plug type, and adapted especially for attachment as a plug connector to the conventional two-connection wall outlet box of the electrical wiring system in dwellings, and other buildings. My invention is embodied in an appliance of this type which may be detachably mounted for support upon the face of a wall and simultaneously plugged in the wall outlet box, and with equal facility the appliance may be detached from its support and disconnected from the outlet fixture of the electrical wiring system, when desired.

In carrying out my invention, I provide a number of stationary socket-plugs for the reception of detachable connectors, together with an extension cord having a movable multi-socket connector to which other connectors may be detachably connected, thus affording numerous connections to which various appliances may with facility be connected for a supply of electrical energy.

A self-winding or automatically spring-operated reel is provided for the extension cord to permit unwinding and to re-wind the cord, and automatic means are provided for controlling the extension cord by a braking action which eliminates slack in the cord and maintains the cord in condition for freedom of movement when desired.

The invention consists in certain novel combinations and arrangements of parts that may readily be assembled to produce an efficient and reliable appliance of this type, as will be more fully set forth and claimed.

In the accompanying drawings, I have illustrated one complete example of the physical embodiment of my invention wherein the parts are combined and arranged in accord with one mode I have thus far devised for the practical application of the principles of my invention, but it will be understood that changes and alterations may be made in these exemplifying drawings and mechanical structures within the scope of my claims without departing from the principles of my invention.

Figure 3 is a sectional view on the line 3—3 of Figure 1 and

Figure 4 is a sectional view at line 4—4 of Figure 2.

Figure 1:
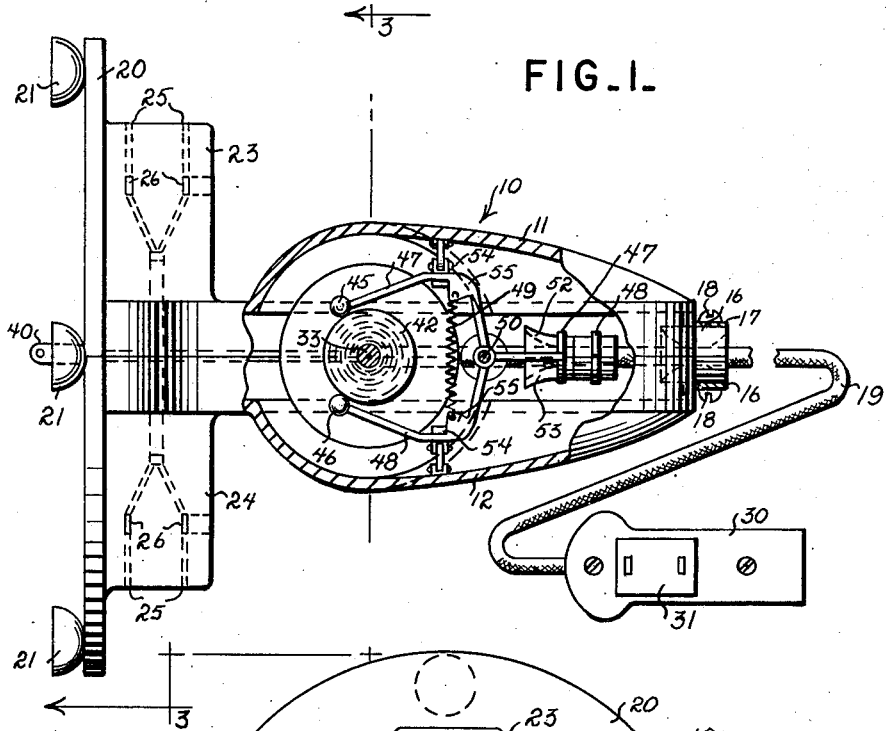
Figure 1 is a side view partly in section on the line 1—1 of Figure 4 of an appliance embodying my invention.
Figure 2:
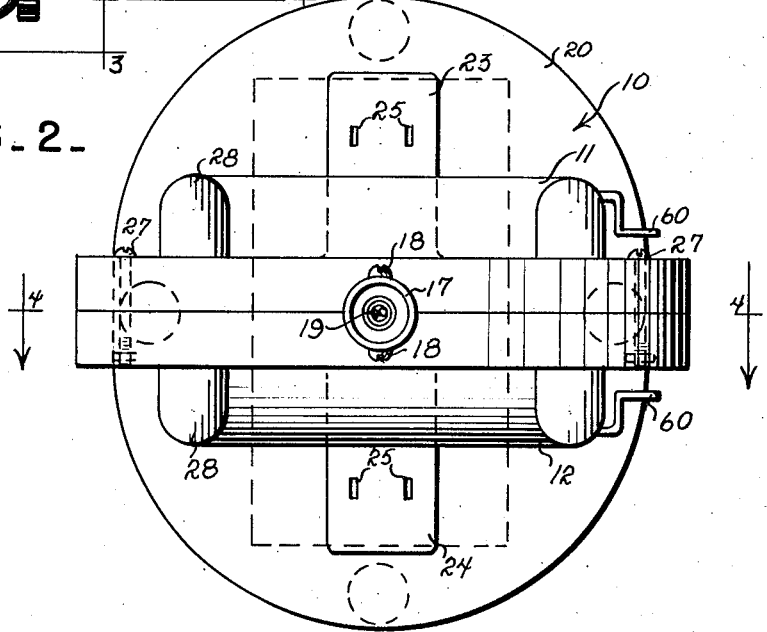
Figure 2 is a front view of Figure 1 showing the cable in section.

In the form of the invention illustrated in the drawings, the housing or box 10 for enclosing operating parts of the appliance is shown as made up of two sections, 11 and 12 respectively for convenience of manufacturing and assembly, and these parts or sections are fashioned from Bakelite or other molded material that is a non-conductor of electricity. The two housing sections at their rear ends are provided with complementary openings or grooves that fit around a joint plug 13, which is fashioned with an interior attaching flange 14, and by means of screws 15 the sections are rigidly united with the joint-plug.

At the front center of the housing, the two sections are fashioned with complementary grooved integral lugs 16, which together form a tubular bushing, the parts of which are securely clamped together by means of a metal clamping ring 17 and screws 18, to provide a guiding nipple for the extension cord 19 of the appliance.

At the back portion the housing is fashioned with an upright flat wall or oval shaped attaching flange 20, and the flange is equipped with a suitable number of spaced attaching means, as rubber suction cups 21. These cups are provided with retaining heads 22 that are embedded in the molded material of the back attaching flange 20, and the rubber suction cups form detachable fastening means for rigidly mounting the appliance on the face of a wall or against the face of a conventional plate of the usual outlet box mounted in the wall.

Two integral or stationary, upper and lower socket-plugs 23 and 24 are provided with pairs of slots 25 on the face thereof and slots 26 on the side thereof for insertion of pronged plugs or connectors on customary extension cords, and the housing is provided with screw bolts and nuts indicated at 27, which clamp together the sections 11 and 12 of the housing.

For the accommodation of working or operating parts of the portable appliance, the housing is fashioned with outwardly extending enlargements 28 which, together with the sections 11 and 12, form an interior chamber for the rotary spool 29 upon which the cord or cable 19 may be wound, and from which the cord may be unwound for extension purposes. The cord or cable contains the usual two insulated wires, and at its free outer end the cord is equipped with a fixture or portable plug 30 that is provided with multi-sockets as at 31 for the reception of the conductor prongs of other extension cords, or prongs may be added for connection with other sockets, to permit interchangeable use of the extension plug 30.

The free end of the cord 19 is extended through the flared guiding nipple formed by the bushings 16, and the inner end of the wires forming the cord are anchored upon the tubular stem 32 of the winding and unwinding spool 29. The spool is fashioned of non-conducting material, and its stem encloses two conductor shafts 33 and 34 respectively, spaced apart at the center of the spool, and protruding from the ends of the spool to form journal bearings for the spool. As best seen in Figure 4, the two wires of the cord 19 are provided with terminals which are fastened by screws 35 and 36 to the two conductor shafts 33 and 34 respectively, and these terminal connections provide the means for anchoring the cord to the spool so that the cord may by a pull be unwound from the spool.

To facilitate rotary movement of the spool, the journal ends of the conductor shafts are provided with journal bushings 37 and these bushings are supported in ball bearing races 38 mounted in the material of the housing at the opposite ends of the reel.

Each journal bushing 37 has a brush ring 39 integral therewith, and for each brush ring 39, stationary conducting arms 24 and 25 are provided, for conducting energy through the conductor shafts from the terminals 40 to the extension cord and terminals 41 are provided for conducting energy to the sockets 26. These conductor arms are of flexible copper strips or wires and extend from the brush rings through the interior of the housing to the joint plug 13, in which they are firmly mounted, and the spaced terminals 40 form the pair of prongs that are inserted in sockets of the wall box or outlet box of the electrical system.

In Figure 4, the terminals 41 are sectional, and upon engagement with the terminals in the mating sections (not shown) conduct current to the two stationary plugs 23 and 24 to supply current to these parts of the appliance; and it will be understood that a master switch may be provided for controlling current in the appliance, or the usual switch on an outlet wall box may be relief upon for control of current to the appliance.

The spool 29 is automatically rotated or spring retracted, to re-wind the cord 19 thereon and the cord 19 is unwound from the spool by manual force of a pull; and means are provided for stabilizing the movements of the cord to prevent tangling, and to take up slack.

For this purpose the spool is provided with a pair of helical springs 42 and 43 respectively, one at each end, with the inner ends of the springs attached to the spool, and the coils of the spring surround the axis of the spool. The springs are preferably mounted so that non-conductive washers 44 that are provided with a central opening to accommodate the shafts at each end of the spool are mounted intermediate the springs and brush rings 39 and these washers are fixed in the housing 10. The outer end of each spring is anchored to the washers in order that the spring may be wound up and reduced in diameter by a pull on the cord; and the spring is automatically retracted when the cord is released, resulting in an expansion in the coils and increased overall diameter of the spring.

The variations in the diameter of the reel springs 42 and 43 are utilized in connection with a spring-applied friction brake device that co-acts with the cord 19 for stabilizing the cord; thus when the springs are fully expanded there is a slight braking action on the cord; as the cord is pulled out and the springs are wound up or compressed to smaller diameter, the braking action on the cord is increased.

One example of a braking device is illustrated in connection with the springs, and the spring applied braking device is of the toggle-lever or scissors arrangement.

In engagement with each of the springs are a pair of balls 45 and 46 respectively, which are diametrically arranged to bear on the outer periphery of the springs.

The balls 45 and 46 are formed on the ends of a pair of angular arms 47 and 48 respectively, and a brake spring 49 for each pair of arms tensions these arms to hold the balls in contact with the springs, and also aiding in applying the brake device to the cord 19.

The angular arms 47 and 48 are crossed, and pivotally supported at their crossing by a pin 50 mounted in bushings 51 mounted in the housing 10, and the opposed arms of these crossed levers are each equipped with a friction brake shoe, as at 52 and 53 respectively, which are adapted to apply braking pressure on diametrically opposite faces of the cord 19.

From this disclosure and description, it will be apparent that the springs 49 constantly tend to apply the brake shoes 52 and 53 to the cord, and the pressure of the brake shoes varies with changes in diameter of the coiled spring 42 and 43, i. e., as the diameter of the springs gradually decreases with its compression, the force exerted by spring 49 is increased to increase the braking pressure of the shoes; and as the diameter of the expanding springs increases, the force exerted by springs 49 is reduced, thereby reducing the applied brake pressure.

In this manner the winding and unwinding of the cord on and off the spool is regulated and controlled, the cord within the housing is held taut, and the extension of the cord exterior of the housing is prevented from tangling, for the reason that the hand pull on the cord maintains the desired tautness outside of the housing, while the automatic winding action of the springs in co-action with the brake device insures constant regulation and control of the movement of the cord within the housing.

When it is desired to rewind the cord 19 on the spool 29, the following mechanism is employed: Extending parallel with the stem 32 of the spool 29 are the parallel and opposed bars 54 and these bars engage the inner surface of the arms 47 and 48 at the shoulder 55 to which the springs 49 are connected, and these bars are pivoted at 56 to arms 57 which are pivoted on the housing 10 at 58 and extend outwardly of the housing through slots 59 to terminate in opposed finger grips 60. Therefore, pressure on the grips 60, forcing them together moves the arms 47 and 48 outwardly to relieve the pressure of the shoes 52 and 53 on the cord 19 to permit the action of the springs 42 and 43 to rewind the cord.

It is believed that from the foregoing description, the structure and operation of my invention will be clearly understood by those skilled in the art, and it is to be understood that various changes and alterations may be made in the mechanical structures illustrated in this embodiment of my invention, which come within the spirit of the invention and the scope of my appended claims.

Having thus fully described my invention, what I claim as new and desire to secure by Letters Patent is:

1. In an electrical appliance as described, the combination with a spool having an extension cord, and coiled springs for retracting the spool, a spring-actuated friction-brake for the cord, and lever connections between the friction-brake and the coiled springs whereby the applied brake pressure varies with the diameter of the coiled springs.

2. The invention as in claim 1 wherein means is provided for co-action with said lever connections for releasing the brake pressure to permit rewinding of the cord on the spool.

3. In an electrical appliance as described, the combination with a spool having an extension pull-cord and coiled springs for retracting the spool of a pair of balls having contact with the peripheries of the springs, crossed and pivoted levers supporting the balls, a spring connecting said levers, and brake shoes mounted on said levers in frictional contact with the cord.

4. In an electrical appliance as described, the combination with a spool having an extension pull-cord and coiled springs for reacting the spool of a pair of resiliently connected pivoted levers connected to said coiled springs, brake shoes on the levers in frictional contact with the cord, and means co-acting with the coiled springs and the levers connected thereto whereby the applied brake pressure varies with the diameter of the coiled springs.

THOMAS C. THOMPSON.

REFERENCES CITED

The following references are of record in the file of this patent:

UNITED STATES PATENTS

| Number | Name | Date |
|---|---|---|
| 324,724 | Peterson | Aug. 18, 1885 |
| 1,978,734 | Apple et al. | Oct. 30, 1934 |